(12) United States Patent
Obata et al.

(10) Patent No.: US 11,184,487 B2
(45) Date of Patent: Nov. 23, 2021

(54) IMAGE FORMING APPARATUS

(71) Applicant: CANON KABUSHIKI KAISHA, Tokyo (JP)

(72) Inventors: Shuji Obata, Noda (JP); Tetsuhiro Yoshimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 16/666,197

(22) Filed: Oct. 28, 2019

(65) Prior Publication Data
US 2020/0145542 A1 May 7, 2020

(30) Foreign Application Priority Data
Nov. 5, 2018 (JP) .............................. JP2018-207949

(51) Int. Cl.
*G06K 9/00* (2006.01)
*H04N 1/00* (2006.01)
*G03G 15/00* (2006.01)
*G06F 3/12* (2006.01)

(52) U.S. Cl.
CPC ......... *H04N 1/00037* (2013.01); *G03G 15/55* (2013.01); *G06F 3/1278* (2013.01); *H04N 1/00039* (2013.01); *H04N 1/00055* (2013.01); *H04N 2201/0091* (2013.01)

(58) Field of Classification Search
CPC ........... H04N 1/00037; H04N 1/00039; H04N 1/00053; H04N 1/00055; H04N 2201/0091; G06F 3/1278; G03G 15/55
See application file for complete search history.

(56) References Cited

U.S. PATENT DOCUMENTS

| 5,412,295 A | * | 5/1995 | Maruyama | G03G 15/5004 318/434 |
|---|---|---|---|---|
| 2007/0280720 A1 | | 12/2007 | Kimura | 399/88 |
| 2015/0125174 A1 | * | 5/2015 | Yamaguchi | G03G 15/80 399/88 |
| 2017/0187321 A1 | * | 6/2017 | Nagatsuka | G03G 15/5004 |

FOREIGN PATENT DOCUMENTS

| EP | 0602343 | 6/1994 |
|---|---|---|
| JP | 2006-062129 | 12/2007 |
| JP | 2008-145948 | 6/2008 |

OTHER PUBLICATIONS

U.S. Appl. No. 16/666,228, filed Oct. 28, 2019.
Extended European Search Report dated Mar. 23, 2020 in counterpart EP Application No. 19206449.1.

* cited by examiner

*Primary Examiner* — Moustapha Diaby
(74) *Attorney, Agent, or Firm* — Venable LLP (57) ABSTRACT

The image forming apparatus includes the power supply board for generating a +24V power supply voltage and a driver board for driving a load for forming an image, and an engine control board for controlling an operation of a driver board. The driver board includes a fuse which receives the 24V power supply voltage supplied from the power supply board. The driver board drives the load by +24V_FU1 voltage output from the fuse. The engine control board identifies, when an abnormality occurs in an operation of the load, a board that is a cause of the abnormality according to a voltage value of the +24V_FU1 voltage and the voltage value of the power supply voltage.

17 Claims, 9 Drawing Sheets

IMAGE FORMING APPARATUS

BACKGROUND OF THE INVENTION

Field of the Invention

The present disclosure relates to a technology of identifying, when an abnormality has occurred in operation of an image forming apparatus such as a copying machine or a printer, a failure portion being a cause of the abnormality.

Description of the Related Art

An image forming apparatus is configured to form an image on a sheet by causing a plurality of components to operate in cooperation with one another. The operation of each component is controlled individually. When the operation control is not finished normally, the image forming apparatus notifies of occurrence of an abnormality by displaying an error code or transmitting an error code to a call center via a network. A service engineer of the image forming apparatus repairs the image forming apparatus, such as replacement of a component part of a failure portion, based on the error code. In this manner, service support for recovering the operation of the image forming apparatus to a normal state is operated.

Japanese Patent Application Laid-Open No. 2008-145948 describes an image forming apparatus which clearly and surely provides the service engineer with a method for dealing, by printing a service manual corresponding to an error code, with an abnormality that has occurred.

In the service manual, information concerning a components (units) related to the abnormality and procedures for replacing the units and the like are clearly shown. The service engineer replaces related the units one by one according to the service manual. The service engineer performs a repair work while confirming an occurrence of an error each time the units are replaced. When the failed unit is a unit which is described in the last part of the replacement procedure in the service manual, or when there are a large number of units to be replaced, the work time for replacing the units becomes long. Therefore, it is desirable to provide an image forming apparatus which can quickly identify a failed unit which causes an error when an error has occurred.

SUMMARY OF THE INVENTION

An image forming apparatus according to the present disclosure includes: a power supply board configured to generate a power supply voltage; a driver board, which includes a protection element to which the power supply voltage provided from the power supply board is applied, configured to drive a load used for forming an image using a voltage output from the protection element; an engine control board configured to control an operation of the driver board, and at least one processor configured to identify, in a case where an abnormality occurs in an operation of the load, a board that caused the abnormality based on a voltage value of the voltage output from the protection element and a voltage value of the power supply voltage.

Further features of the present invention will become apparent from the following description of exemplary embodiments (with reference to the attached drawings).

DESCRIPTION OF THE EMBODIMENTS

An image forming apparatus according to at least one embodiment of the present disclosure is described with reference to the drawings.

Image Forming Apparatus

Figure 1:
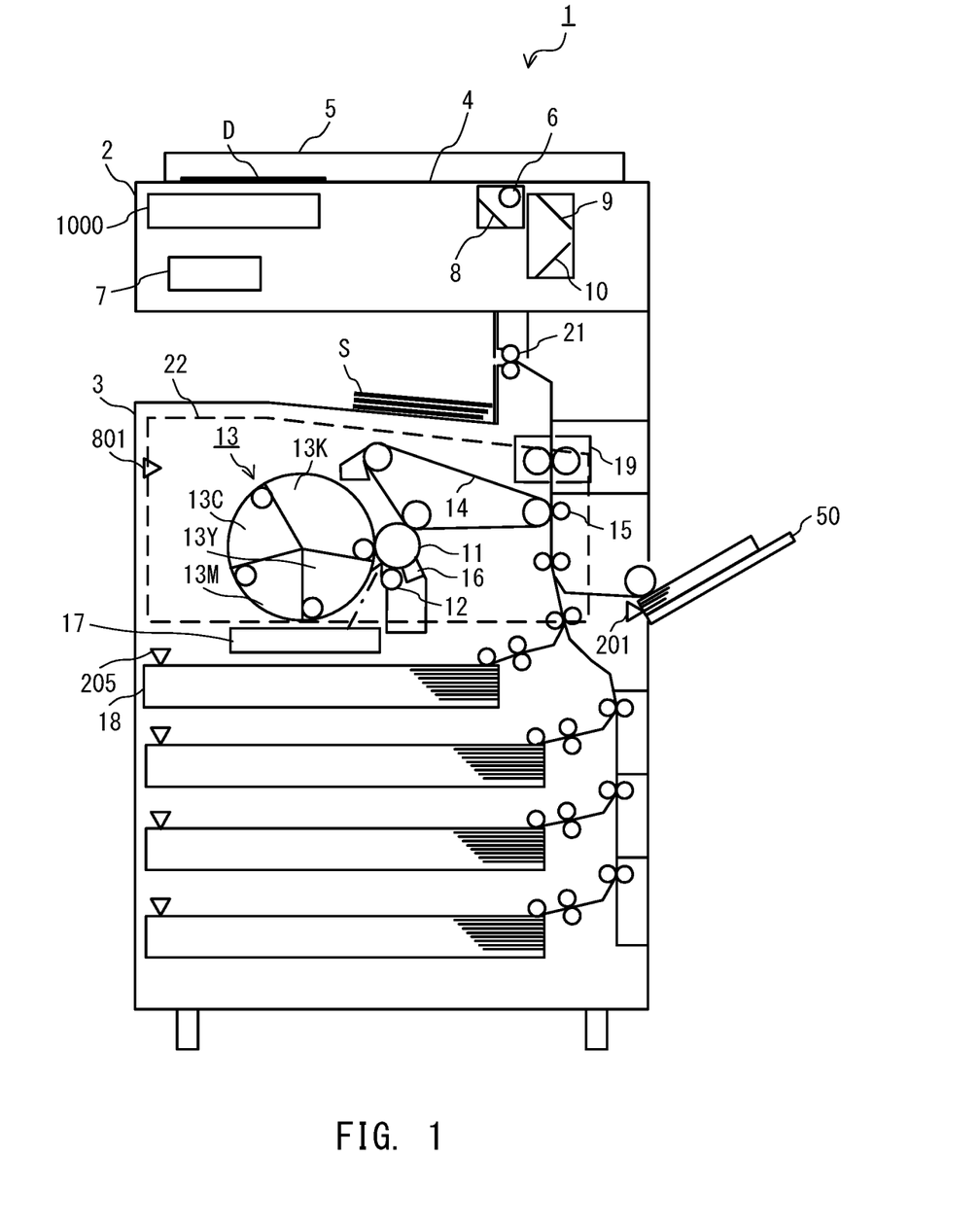
FIG. 1 is a configuration diagram of an image forming apparatus according to at least one embodiment of the present disclosure.

FIG. 1 is a configuration diagram of an image forming apparatus according to at least one embodiment of the present disclosure. The image forming apparatus 1 includes an image reader 2, an image forming unit 3, and an operation unit 1000. The image reader 2 is configured to read a document image from a document D. The image forming unit 3 is configured to form an image on a sheet S. The operation unit 1000 is a user interface including an input device such as a key button or a touch panel and an output device, for example, a display. The image forming apparatus 1 includes a copying function of forming the original image read by the image reader 2 on the sheet S by the image forming unit 3.

The image reader 2 includes, on its upper side, a document table 4 formed of a transparent glass plate and a document pressing plate 5. The document D is placed at a predetermined position on the document table 4 with an image side thereof facing downward. The document pressing plate 5 presses the document D placed on the document table 4 in a fixed manner. A lamp 6 for irradiating the document D with light, an image processing unit 7, and an optical system including reflection mirrors 8, 9, and 10 for guiding an optical image of the irradiated document D to the image processing unit 7 are installed below the document table 4. The lamp 6 and the reflection mirrors 8, 9, and 10 move at a predetermined speed to scan the document D. The image processing unit 7 generates image data representing a document image based on the optical image of the irradiated document D.

In order to form an image, the image forming unit 3 includes components such as a photosensitive drum 11, a first charging roller 12, a rotary developing unit 13, an intermediate transfer belt 14, a transfer roller 15, a cleaner 16, a laser unit 17, and a fixing device 19. The photosensitive drum 11 is a photosensitive member having a drum shape, and the surface of the photosensitive drum 11 is uniformly charged by the first charging roller 12. The laser unit 17 acquires image data from the image reader 2, and irradiates the photosensitive drum 11 having the charged surface with laser light whose light emission is controlled in accordance with this image data. With this process, an electrostatic latent image that depends on the image data is formed on the surface of the photosensitive drum.

The rotary developing unit 13 causes toners of respective colors of magenta (M), cyan (C), yellow (Y), and black (K) to adhere to the electrostatic latent image formed on the surface of the photosensitive drum 11, to thereby form a toner image on the surface of the photosensitive drum 11. The rotary developing unit 13 is a developing device of a rotational development system. The rotary developing unit 13 includes a developing device 13K, a developing device 13Y, a developing device 13M, and a developing device 13C, and is rotated by a motor (rotary motor). The developing device 13K is configured to develop an image by toner of black. The developing device 13Y is configured to develop an image by toner of yellow. The developing device 13M is configured to develop an image by toner of magenta. The developing device 13C is configured to develop an image by toner of cyan.

When a monochrome toner image is to be formed on the photosensitive drum 11, the rotary developing unit 13 develops an image by causing the developing device 13K to rotationally move to a development position close to the photosensitive drum 11. When a full-color toner image is to be formed, the rotary developing unit 13 rotates to arrange the respective developing devices 13Y, 13M, 13C, and 13K at development positions in order, to thereby develop an image by toners of respective colors in order.

The toner image formed on the photosensitive drum 11 by the rotary developing unit 13 is transferred onto the intermediate transfer belt 14 being a transfer member. Toners that remain on the photosensitive drum 11 after the transfer are cleaned by the cleaner 16. When forming a full-color toner image, the toner image is transferred from the photosensitive drum 11 to the intermediate transfer belt 14 for each color. Therefore, the toner images are transferred to the intermediate transfer belt 14 one by one in the order of yellow, magenta, cyan, and black. The cleaner 16 removes the toner remaining on the photosensitive drum 11 each time the toner is transferred. As described above, the toner images are sequentially transferred one by one to thereby forming a full-color toner image on the intermediate transfer belt 14.

The toner image transferred onto the intermediate transfer belt 14 is transferred onto the sheet S by the transfer roller 15. The sheet S is supplied to the transfer roller 15 from a paper cassette 18 or a manual feed tray 50. The image forming apparatus 1 includes a feeding mechanism, for example, a roller, for supplying the sheet S to a conveyance path.

The fixing device 19 is installed on a downstream side of the transfer roller 15 with respect to a conveyance direction of the sheet S. The fixing device 19 fixes the transferred toner image onto the sheet S. The sheet S on which the toner image is fixed is delivered from the fixing device 19 to the outside of the image forming apparatus 1 via a discharge roller pair 21.

The image forming apparatus 1 includes a front door 22, which is openable and closable, in order to enable access to component parts such as the photosensitive drum 11 and the rotary developing unit 13 inside the image forming apparatus 1. The front door 22 is opened at the time of repair or inspection of each component described above inside the image forming apparatus 1 or at the time of replacement of consumables inside the image forming apparatus 1. The image forming apparatus 1 includes a front door open/close sensor 801 for detecting opening/closing of the front door 22.

The image forming apparatus 1 includes a paper cassette opening/closing sensor 205 for detecting opening/closing of each paper cassette 18, and a paper size detection sensor (not shown) configured to detect a size of the sheet S inside the paper cassette 18. When the paper cassette 18 is closed, the paper cassette opening/closing sensor 205 detects this closing. When the paper cassette opening/closing sensor 205 detects closing of the paper cassette 18, the paper size detection sensor automatically detects the size of the sheet S based on the result of detection.

The image forming apparatus 1 includes a manual feed sensor 201 configured to detect whether there is a sheet S on the manual feed tray 50. When the manual feed sensor 201 has detected the fact that the sheet S is placed on the manual feed tray 50, the image forming apparatus 1 displays, on the operation unit 1000, a screen for urging the user to set the size of the placed sheet S. The user sets the sheet size in accordance with the instruction on the screen, to thereby enable the image forming apparatus 1 to recognize the size of the sheet S on the manual feed tray 50. The configuration of the image forming apparatus 1 is not limited to the above-mentioned configuration, and for example, an image forming apparatus having a well-known configuration in which a plurality of photosensitive drums are arranged along a movement direction of a transfer belt in association with a plurality of color components may be employed.

First Embodiment

Figure 2:
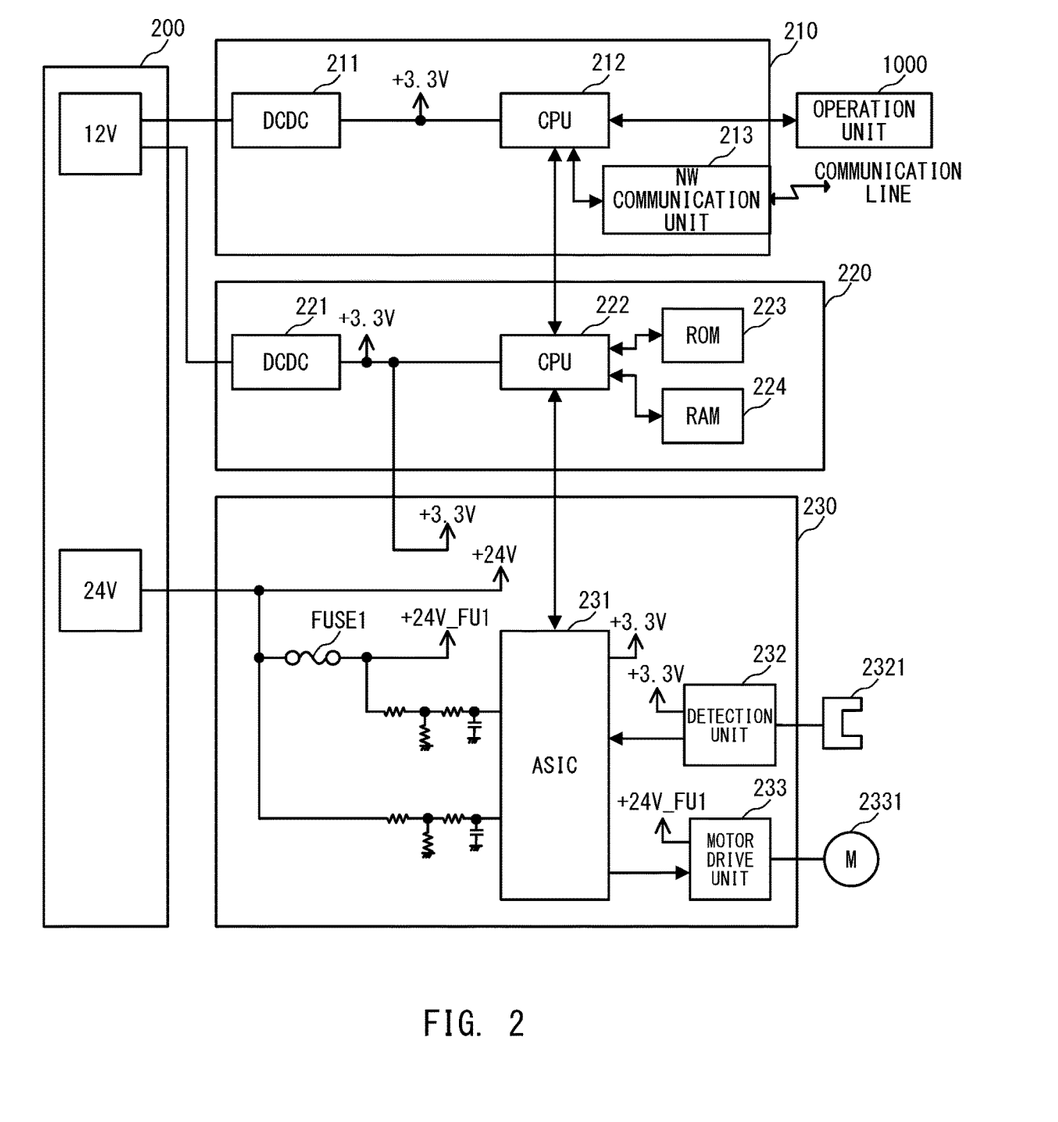
FIG. 2 is an explanatory diagram of a control system for the image forming apparatus.

FIG. 2 is an explanatory diagram of a control system of the image forming apparatus 1 of the first embodiment. The control system includes four types of boards, i.e., a power supply board 200, a controller board 210, an engine control board 220, and a first driver board 230.

The power supply board 200 generates and outputs two types of power supply voltages (+12V and +24V in the first embodiment). A power supply voltage of +12V (+12V power supply voltage) is supplied to the controller board 210 and the engine control board 220. A power supply voltage of +24V (+24V power supply voltage) is supplied to the first driver board 230.

The controller board 210 includes a DC-DC converter 211, a CPU (Central Processing Unit) 212, and an NW communication unit 213. The DC-DC converter 211 transforms the +12V power supply voltage supplied from the power supply board 200 to a voltage of +3.3V. The voltage of +3.3V generated by the DC-DC converter 211 is used for operations of the CPU 212 and external components. The CPU 212 controls an operation of the engine control board 220. The NW communication unit 213 is a communication interface that controls communication with an external device such as a call center via a communication line such as a LAN (Local Area Network). The CPU 212 communicates with the external device via the NW communication unit 213. The CPU 212 is connected to the operation unit 1000 and causes the operation unit 1000 to display a message or the like. Further, the CPU 212 receives an input such as an instruction from the operation unit 1000.

The engine control board 220 includes a DC-DC converter 221, a CPU 222, a ROM (Read Only Memory) 223, and a RAM (Random Access Memory) 224. The DC-DC converter 221 transforms the +12V power supply voltage supplied from the power supply board 200 to a voltage of +3.3V. The voltage of +3.3V generated by the DC-DC converter 221 is used for an operation of the CPU 222 and the first driver board 230. The CPU 222 executes the computer program stored in the ROM 223 to control the operation of each component to perform various control sequences related to the image forming process. At that time, the RAM 224 is used as a work memory to store rewritable data that needs to be temporarily or permanently stored. The CPU 222 controls an operation of the first driver board 230. The RAM 224 stores information regarding the abnormality when the abnormality occurs.

The first driver board 230 includes an ASIC (Application Specific Integrated Circuit) 231, a detection unit 232, a motor drive unit 233, and a FUSE 1. A FUSE 1 is a protective element to which a +24V power supply voltage is supplied from the power supply board 200. Instead of the FUSE 1, a field effect transistor (FET) or an overcurrent protection IC (Integrated Circuit) may be used as the protective element. The +24V power supply voltage is supplied, via the FUSE 1, to other components, e.g., the motor drive unit 233 or the like, as a +24V_FU1 voltage.

In order to decide whether or not the +24V power supply voltage is normally supplied from the power supply board 200, the +24V power supply voltage is divided to be within a rated range of the ASIC 231, and is input to an analog port of the ASIC 231 as a +24V power supply detection signal. Similarly, in order to decide whether or not the +24V_FU1 voltage is normally supplied to the subsequent stage of the FUSE 1, the +24V_FU1 voltage is divided to be within the rated range of the ASIC 231, and is input to the analog port of the ASIC 231 as a +24V_FU1 power supply detection signal. The configuration for determining whether or not the +24V power supply voltage is normally supplied is not limited to the above. For example, the +24V power supply voltage may be converted into a digital value by a detection circuit such as a transistor to be input to the digital port of the ASIC 231.

A predetermined number of motor driving units are provided on the first driver board 230. The motor driving units are used for driving the rotary developing unit 13 shown in FIG. 1 and a load such as a motor used for sheet conveyance. The +24V_FU1 voltage is used for operations of these loads. When an abnormality occurs in a power system of the +24V power supply voltage due to the load connected to the first driver board 230, the FUSE 1 prevents the failure from spreading to the power supply board 200 positioned at an upstream side. Therefore, the +24V_FU1 voltage is supplied to these loads via the FUSE 1. In addition, a sensor for detecting the sheet size shown in FIG. 1 and a predetermined number of detection units for obtaining a detection result of the sensor for detecting presence or absence of the sheet are provided on the first driver board 230.

In the present embodiment, a drum motor 2331 which controls rotation of the photosensitive drum 11 during image forming and a drum rotation detector 2321 which detects the rotation of the photosensitive drum 11 are connected to the first driver board 230. For this purpose, the first driver board 230 includes a motor drive unit 233 for driving the drum motor 2331 and a detection unit 232 for obtaining a detection result of the drum rotation detector 2321. An operation of the motor drive unit 233 is controlled by the ASIC 231. The detection unit 232 transmits the detection result of the drum rotation detector 2321 to the ASIC 231.

The timing of driving the load (drum motor 2331) of the ASIC 231 is controlled by a CPU 222 of the engine control board 220. The CPU 222 of the engine control board 220 monitors the state of signals obtained by the ASIC 231. The CPU 222 of the engine control board 220 communicates with the CPU 212 of the controller board 210 to control the operation of the control system in cooperation with the CPU 212.

When the CPU 212 of the controller board 210 obtains an image forming start instruction from the user via an operation unit 1000 or a communication line, the CPU 212 notifies the CPU 222 of the engine control board 220 that the image forming start instruction has been issued. The CPU 222 of the engine control board 220 stores information concerning an abnormality detected at the first driver board 230 in the RAM 224. The CPU 222 notifies the CPU 212 of an occurrence of the abnormality at the controller board 210. When the occurrence of an abnormality is notified, the CPU 212 of the controller board 210 notifies, using the operation unit 1000 or the like, the user or a service engineer of the occurrence of the abnormality. Further, the CPU 212 notifies, using the NW communication unit 213, the call center of the occurrence of the abnormality via the communication line. As described above, the occurrence of the abnormality is notified to the service engineer at the call center as well as the user and the service engineer at a place where the image forming apparatus 1 is provided.

Image Forming Process

Figure 3:
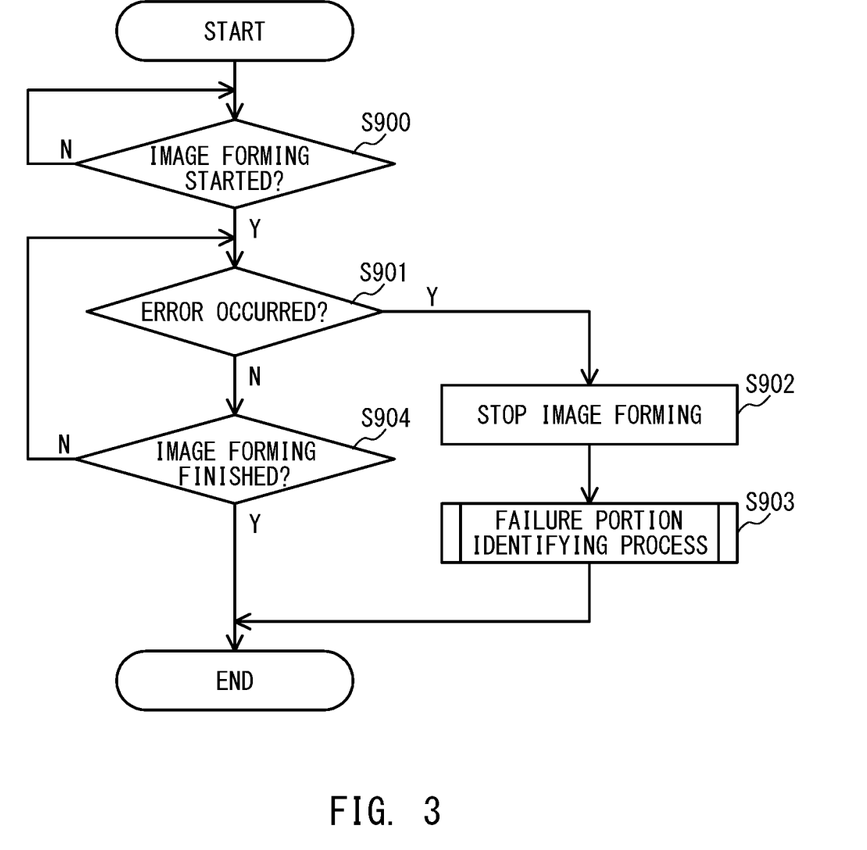
FIG. 3 is a flow chart for representing a process for performing image forming.

FIG. 3 is a flowchart showing processes performed by the image forming apparatus 1 at the time of image forming. The CPU 212 of the controller board 210 is in a standby state until it receives the image forming start instruction via the operation unit 1000 or the communication line (Step S900: N). Upon receiving the instruction to start image forming (Step S900: Y), the CPU 212 transmits an instruction to form an image to the CPU 222 of the engine control board 220. The CPU 222 of the engine control board 220 starts an image forming process in response to this instruction. The ASIC 231 of the first driver board 230 monitors an occurrence of an error due to an abnormality of each component until the image forming process ends (Step S901: N, 904: N). The ASIC 231 monitors an occurrence of a load error based on the detection results of various sensors provided in the image forming apparatus 1. After finishing the image forming (Step S904: Y), the CPU 212 finishes the image forming process.

When a load operation error occurs during the image forming process (Step S901: Y), the ASIC 231 notifies the CPU 222 of the engine control board 220 of the occurrence of the abnormality. In the present embodiment, after starting control of rotating the drum motor 2331, if the drum rotation detector 2321 does not detect the rotation of the photosensitive drum 11 even after a predetermined time has elapsed, it is determined that an abnormality (error) is detected. The CPU 222 of the engine control board 220 stops the image forming process when the notification of the occurrence of the abnormality is received (Step S902). The CPU 222 of the engine control board 220 performs a failure portion identifying process (Step S903). When the failure portion identifying process is finished, the CPU 212 finished the image forming process. The failure portion identifying process may be performed when the abnormality occurs due to a pre-multi-rotation operation (preparation operation) at a time of startup of the image forming apparatus 1. However, the description thereof is omitted here.

Failure Portion Identifying Process

Figure 4:
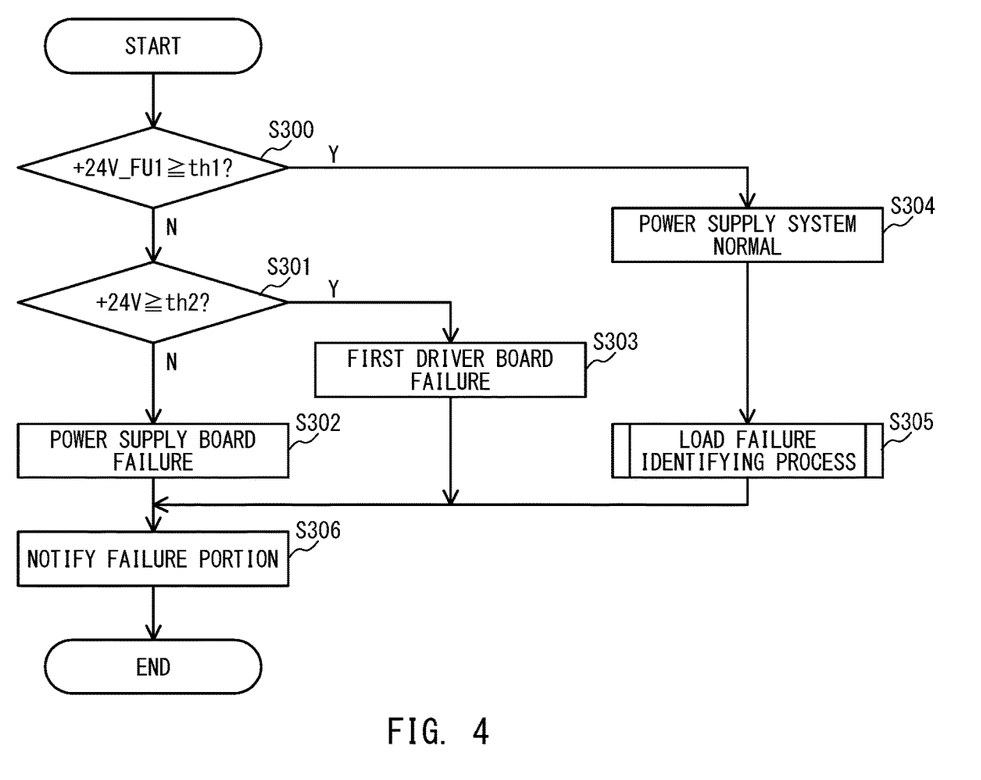
FIG. 4 is a flow chart for representing a failure portion identifying process.

FIG. 4 is a flowchart showing the failure portion identifying process in S903 of FIG. 3. This process shows the failure portion identifying process when the abnormality occurs in the operation of the load to which the +24V_FU1 voltage is supplied. This process is a power supply diagnosis process for diagnosing a state of a power system of the +24V power supply voltage when the abnormality in the operation of the load is detected. This process is executed in response to the abnormal operation (error) of the drum motor 2331, which is a load.

The CPU 222 of the engine control board 220 compares, using the ASIC 231 of the first driver board 230, a voltage value of the +24V_FU1 voltage with a predetermined first threshold th1 (Step S300). Here, the first threshold th1 is set to 18V. When the voltage value of the +24V_FU1 voltage is greater than or equal to the first threshold th1 (Step S300: Y), the CPU 222 determines that the power supply system of the +24V power supply voltage is normal (Step S304). In this case, the CPU 222 determines that the abnormality is caused by the load to which the power supply system is connected to operate. Then, the CPU 222 performs a load failure identifying process for identifying the failed load is executed (Step S305). A detailed description of the load failure identifying process is omitted.

When the voltage value of the +24V_FU1 voltage is less than the first threshold th1 (Step S300: N), the CPU 222 determines that there is a cause of the abnormality in the power supply system of the +24V power supply voltage. The CPU 222 compares, using the ASIC 231, the voltage value of the +24V power supply voltage with a predetermined second threshold th2 (Step S301). Here, the second threshold th2 is set to 18 V, which is the same as the first threshold th1.

When the voltage value of the +24V power supply voltage is greater than or equal to the second threshold th2 (Step S301: Y), the CPU 222 determines that the +24V power supply voltage is normally supplied from the power supply board 200. Thereby, the CPU 222 determines that the cause of the abnormality in the power supply system of the +24V power supply voltage is the voltage output from the FUSE 1 provided on the first driver board 230. Therefore, the CPU 222 determines that the first driver board 230 is a failure portion that has caused the abnormality (Step S303).

When the voltage value of the +24V power supply voltage is less than the second threshold th2 (Step S301: N), the CPU 222 determines that the +24V power supply voltage is not normally supplied from the power supply board 200. Thereby, the CPU 222 determines that the cause of the abnormality is the voltage output from the power supply board 200 in the power supply system of the +24V power supply voltage. Therefore, the CPU 222 determines that the power supply board 200 is the failure portion which has caused the abnormality (Step S302).

Figure 5:
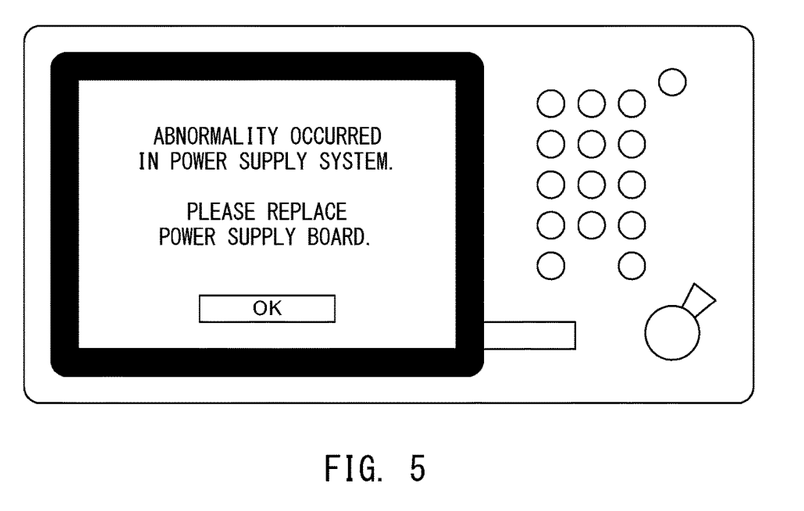
FIG. 5 is an explanatory diagram of a failure portion displayed on an operation unit.

The CPU 222 notifies the CPU 212 of the controller board 210 of the failure portion determined by any of the steps of S302, S303, and S305. In response to the notification, the CPU 212 notifies the failure portion (Step S306). The CPU 212 notifies the failure portion by displaying it on the operation unit 1000. FIG. 5 is a view showing an example of the failure portion displayed on the operation unit 1000. FIG. 5 shows an example of a display when the power supply board 200 has failed. A message for prompting replacement of the power supply board 200 is displayed on the display. In addition, the CPU 212 notifies, using the NW communication unit 213, a support sensor of the failure portion via the communication line. By notifying the failure portion, the failure portion identifying process is finished.

In the above process, the relationship between the first threshold th1 and the second threshold th2 is as follows. In a case where "th1<th2", if the range of the power supply voltage (+24V power supply voltage) supplied from the power supply board 200 is within a range of the first threshold th1 to the second threshold th2, for example, the +24V power supply voltage is determined to be less than the second threshold th2 in the process of S301. Therefore, the cause of the abnormality should be determined as the power supply of the power supply board 200. However, in a case where the +24V_FU voltage is determined to be greater than or equal to the first threshold th1 in the process of S300, which is performed prior to S301, the power supply system may be erroneously diagnosed as normal. Therefore, it is desirable to set the relationship between the first threshold th1 and the second threshold th2 such that the first threshold th1 is greater than or equal to the second threshold th2 (th2 th1). In a configuration of FIG. 2, when detecting a state of the power supply by a detection circuit such as a transistor, it is preferable to set the relationship between the first threshold th1 and the second threshold th2 as described in the above.

As described above, when the abnormality occurs in the image forming apparatus 1, the image forming apparatus 1 determines whether or not a cause of the abnormality is the power supply system. When the cause of abnormality is the power supply system, the image forming apparatus 1 identifies a faulty component part of the power supply system which is the cause of the abnormality. For this reason, the service engineer can omit operations for identifying an abnormality point, and a work time for replacing parts can be reduced.

Second Embodiment

Figure 6:
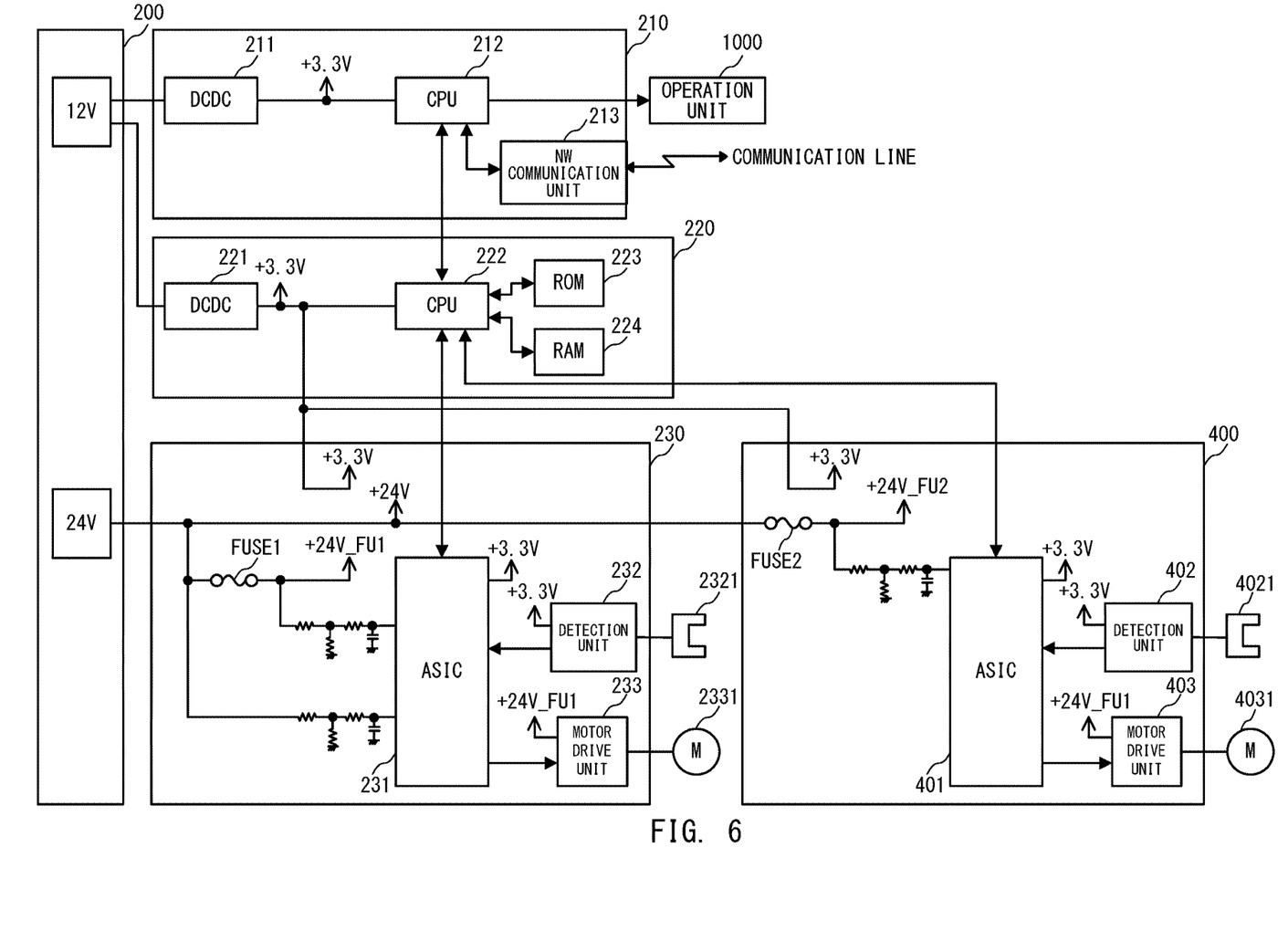
FIG. 6 is an explanatory diagram of a control system.

FIG. 6 is an explanatory diagram of a control system of the image forming apparatus 1 according to the second embodiment. The control system includes five types of boards, i.e., a power supply board 200, a controller board 210, an engine control board 220, a first driver board 230, and a second driver board 400. This control system has a configuration in which the second driver board 400 is added to the control system of FIG. 2. Now, differences between the control system shown in FIG. 2 and that shown in FIG. 6 is described.

The voltage of +3.3V generated by the engine control board 220 is supplied to the second driver board 400 together with the first driver board 230. The CPU 222 of the engine control board 220 controls the operation of the second driver board 400. The +24V power supply voltage supplied from the power supply board 200 is also supplied to the second driver board 400.

The second driver board 400 includes an ASIC 401, a detection unit 402, a motor drive unit 403, and a FUSE 2. The FUSE 2 is a protection element, and the +24V power supply voltage supplied from the power supply board 200 is applied to the same via the first driver board 230. An FET or an overcurrent protection IC may be used as the protection element instead of the FUSE 2. The +24V power supply voltage is, after passing through the FUSE 2, supplied to other components such as the motor drive unit 403 or the like as a +24V_FU2 voltage.

In order to decide whether or not the +24V_FU2 voltage is normally supplied to the subsequent stage of the FUSE 2, the +24V_FU2 voltage is divided to be within the rated range of the ASIC 401, and is input to an analog port of the ASIC 401 as a +24V_FU2 power supply detection signal. Note that the second driver board 400 does not include a power supply detecting means of +24V power supply voltage. When an abnormality occurs in an operation of the load driven by the second driver board 400, in a case where a determination is made, the power supply detection signal of the first driver board 230 is used. Thereby, a signal line required for power supply detection may be eliminated.

Similar to the first driver board 230, a motor drive unit for driving a load is provided on the second driver board 400. The +24V_FU2 voltage is used for a load operation. When a failure occurs in a power system of the +24V power supply voltage due to the load connected to the second driver board 400, the FUSE 2 prevents the failure from spreading to the power supply board 200 positioned at an upstream side. Therefore, the +24V_FU2 voltage is supplied to these loads via the FUSE 2. In addition, similar to the first driver board 230, a predetermined number of detection units for notifying detection results of the sensors are provided on the second driver board 400.

In the present embodiment, an intermediate transfer motor 4031 which controls rotation of the intermediate transfer belt 14 during image forming and an intermediate transfer belt rotation sensor 4021 (hereinafter "rotation sensor 4021") which detects the rotation of the intermediate transfer belt 14 are connected to the second driver board 400. For this purpose, the second driver board 400 includes the motor drive unit 403 for driving the intermediate transfer motor 4031 and the detection unit 402 for obtaining a detection result of the rotation sensor 4021. An operation of the motor drive unit 403 is controlled by the ASIC 401. The detection unit 402 transmits the detection result of the rotation sensor 4021 to the ASIC 401.

The timing of driving the load (intermediate transfer motor 4031) of the ASIC 401 is controlled by the CPU 222 of the engine control board 220. The CPU 222 of the engine control board 220 monitors the state of a signal obtained by the ASIC 401. The CPU 222 of the engine control board 220 communicates with the CPU 212 of the controller board 210 to control the operation of the control system in cooperation with the CPU 212. The CPU 222 of the engine control board 220 stores information indicating the abnormality detected by the first driver board 230 and information indicating the abnormality detected by the second driver board 400 in the RAM 224, and notifies the CPU 212 of the controller board 210 of the information.

Failure Portion Identifying Process

Figure 7A:
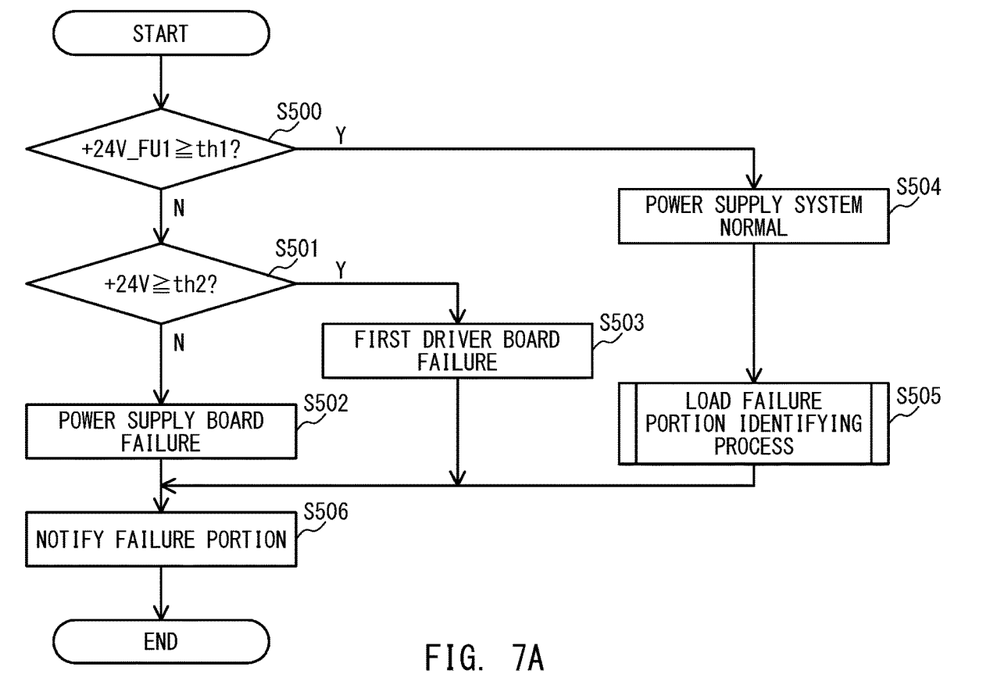
FIG. 7A and FIG. 7B are flow charts for representing a failure portion identifying process.
Figure 7B:
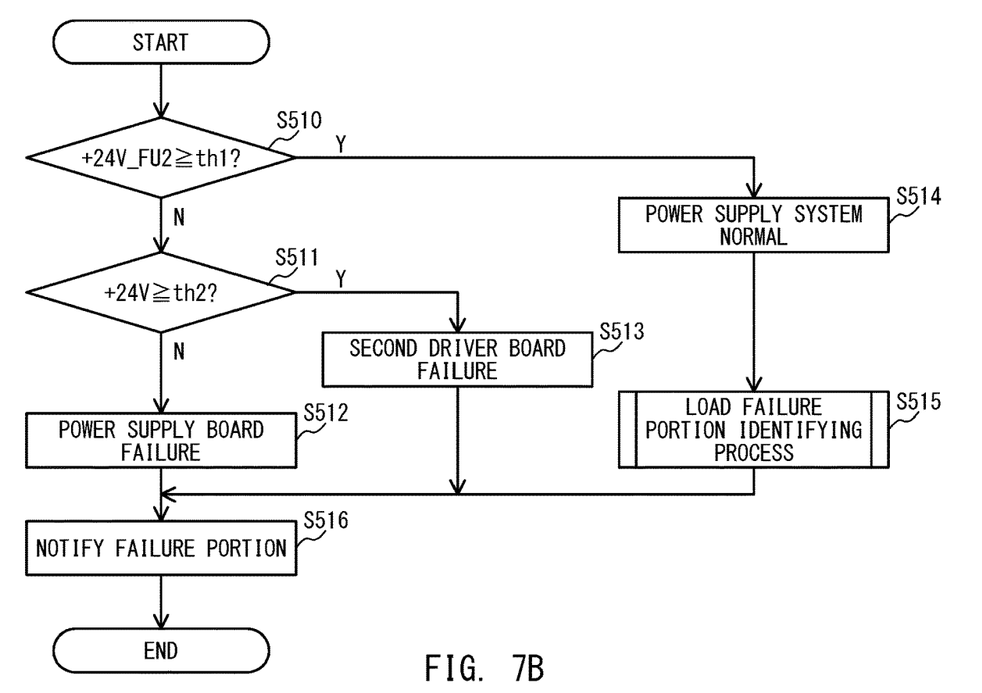

FIG. 7A and FIG. 7B are flowcharts showing the failure portion identifying process of the second embodiment. Note that the image forming process is the same process as in the first embodiment. In the configuration of FIG. 6, when the abnormality occurs in the image forming apparatus 1, the engine control board 220 identifies the failure portion by combining the processes described in FIG. 7A and FIG. 7B.

FIG. 7A shows a process which is executed when the abnormality is detected in the operation of the load connected to the first driver board 230 (load which is driven by the +24V_FU1 voltage), and is the same as the process of FIG. 4. Similar to FIG. 4, the CPU 222 of the engine control board 220 diagnoses a state of the power system of the +24V power supply voltage, and when it is determined that a cause of the abnormality has occurred in the power system, the failure portion is identified. In this process, it is determined that an abnormality (error) has occurred because the drum rotation detector 2321 does not detect the rotation of the photosensitive drum 11 even after a predetermined time has elapsed after starting a control of rotating the drum motor 2331 in the process shown in FIG. 3. Since the process shown in FIG. 7A is the same as that in FIG. 4, a detailed description of the same is omitted.

FIG. 7B shows a process which is executed when the abnormality is detected in the operation of the load connected to the second driver board 230 (load driven by the +24V_FU2 voltage). The CPU 222 of the engine control board 220 diagnoses the state of the power system of the +24V power supply voltage, and when it is determined that a cause of the abnormality has been occurred in the power system, the failure portion is identified. In a case where the rotation sensor 4021 does not detect, after starting the control for rotating the intermediate transfer belt 14, the rotation of the intermediate transfer belt 14 even if a predetermined time has elapsed, it is determined that an abnormality (error) has occurred, and the above described process is performed.

The CPU 222 of the engine control board 220 compares, using the ASIC 401 of the second driver board 400, a voltage value of the +24V_FU2 voltage with a predetermined first threshold th1 (Step S510). Here, the first threshold th1 is set to 18V. When the voltage value of the +24V_FU2 voltage is greater than or equal to the first threshold th1 (Step S510: Y), the CPU 222 determines that the power supply system of the +24V power supply voltage is normal (Step S514). In this case, the CPU 222 determines that the abnormality is caused by the load to which the power supply system is connected to operate. Then, the CPU 222 performs a load failure identifying process for identifying the failed load is executed (Step S515). A detailed description of the load failure identifying process is omitted.

When the voltage value of the +24V_FU2 voltage is less than the first threshold th1 (Step S510: N), the CPU 222 determines that there is a cause of the abnormality in the power supply system of the +24V power supply voltage. The CPU 222 compares, using the ASIC 231 of the first driver board 230, the voltage value of the +24V power supply voltage with the predetermined second threshold th2 (Step S511). Here, the second threshold th2 is set to 18 V, which is the same as the first threshold th1.

When the voltage value of the +24V power supply voltage is greater than or equal to the second threshold th2 (Step S511: Y), the CPU 222 determines that the +24V power supply voltage is normally supplied from the power supply board 200. Thereby, the CPU 222 determines that the cause of the abnormality in the power supply system of the +24V power supply voltage is the voltage output from the FUSE 2 provided on the second driver board 400. Therefore, the CPU 222 determines that the second driver board 400 is the failure portion which has caused the abnormality (Step S513).

When the voltage value of the +24V power supply voltage is less than the second threshold th2 (Step S511: N), the CPU 222 determines that the +24V power supply voltage is not normally supplied from the power supply board 200. Thereby, the CPU 222 determines that the cause of the abnormality is the voltage output from the power supply board 200 in the power supply system of the +24V power supply voltage. Therefore, the CPU 222 determines that the power supply board 200 is the failure portion which has caused the abnormality (Step S512).

The CPU 222 notifies the CPU 212 of the controller board 210 of the failure portion determined by any of steps of S512, S513, and S515. In response to the notification, the CPU 212 notifies the failure portion (Step S516). This notification is performed in the same manner as the method shown in FIG. 4. By notifying the failure portion, the failure portion identifying process is finished. As to the first threshold th1 and the second threshold th2, these thresholds are already described in the first embodiment.

As described above, when the abnormality occurs in the image forming apparatus 1, the image forming apparatus 1 determines whether or not a cause of the abnormality is the power supply system. When the cause of the abnormality is the power supply system, the image forming apparatus 1 identifies a faulty component part of the power supply system which is the cause of the abnormality. For this reason, the service engineer can omit operations for identifying the abnormality point, and a work time for replacing parts can be reduced. Furthermore, even if the abnormality occurs during an operation of the load driven by the second driver board 400, the failure portion can be determined with a required minimum configuration by using the power supply detection signal of the first driver board 230.

Third Embodiment

Figure 8:
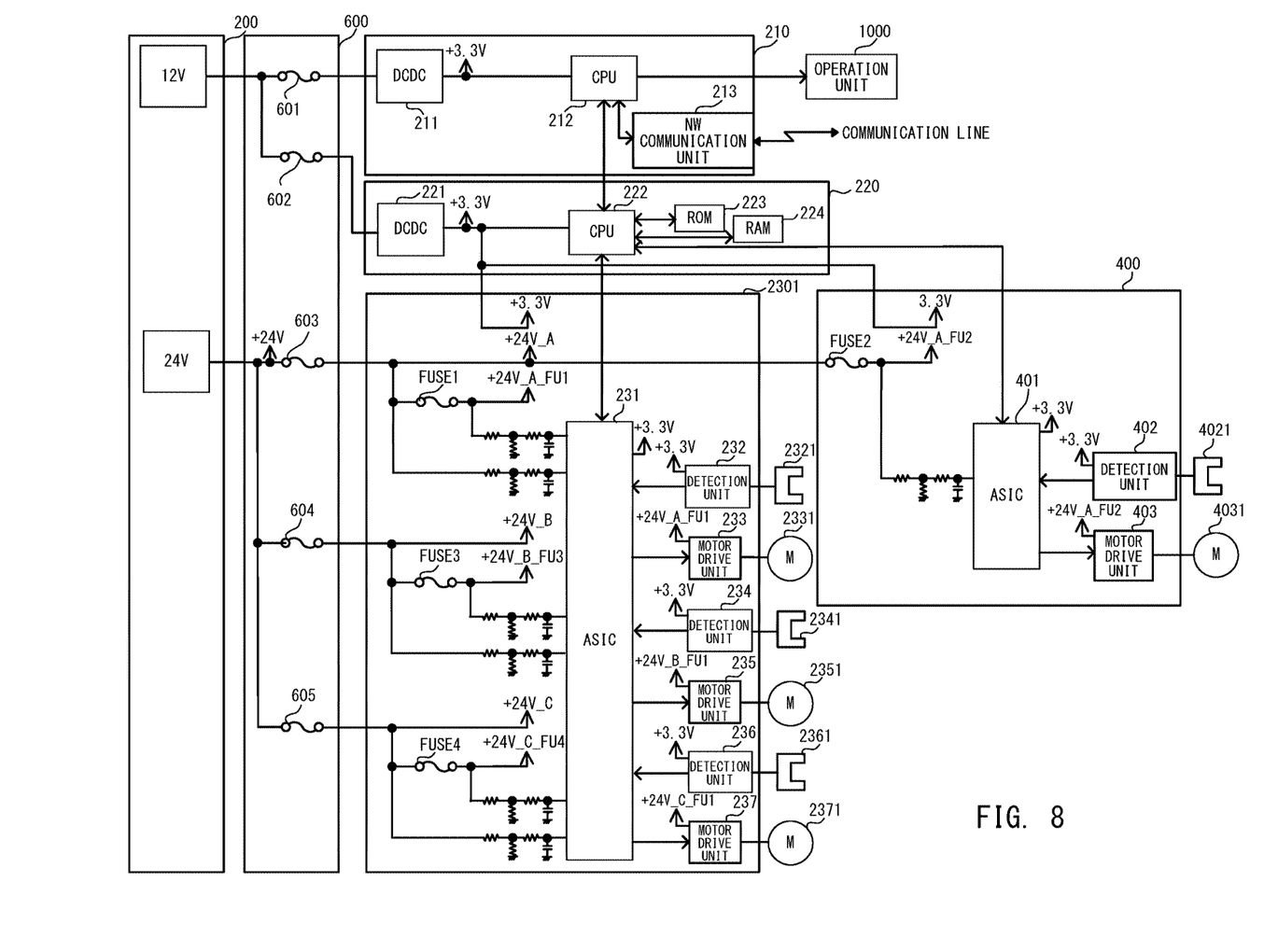
FIG. 8 is an explanatory diagram of a control system.

FIG. 8 is an explanatory diagram of a control system of the image forming apparatus 1 according to the third embodiment. The control system includes six types of boards, i.e., a power supply board 200, a controller board 210, an engine control board 220, a first driver board 2301, a second driver board 400, and a relay board 600. This control system has a configuration in which the relay board 600 is added to the control system of FIG. 6. Further, the first driver board 2301 is different from the first driver board 230 of the first embodiment and the second embodiment in its configuration. Now, differences between the control system shown in FIG. 8 and that shown in FIG. 6 is described.

The power supply board 200 outputs the +12V power supply voltage and the +24V power supply voltage via respective single power supply lines. From the power supply board 200, the +12V power supply voltage and the +24V power supply voltage are supplied to the relay board 600. The relay board 600 includes fuses 601-605. The +12V power supply voltage is divided in the relay board 600, and each of divided voltages is supplied to the controller board 210 and the engine control board 220 via the fuses 601 and 602, respectively. The +24V power supply voltage is divided into three voltages in the relay board 600, and each of the divided voltage is supplied to the first driver board 2301 via the fuses 603-605, respectively. In the present embodiment, a power supply voltage supplied to the first driver board 2301 via the FUSE 603 is described as "+24V_A power supply voltage". A power supply voltage supplied to the first driver board 2301 via the fuse 604 is described as "+24V_B power supply voltage". A power supply voltage supplied to the first driver board 2301 via the fuse 605 is described as "+24V_C power supply voltage". The +24V_A power supply voltage is supplied to the second driver board 400 via the first driver board 2301.

The first driver board 2301 includes an ASIC 231, a plurality of detection units 232, 234, and 246, a plurality of motor drive units 233, 235, and 237, and a plurality of FUSE 1, FUSE 3, and FUSE 4. The FUSE 1, FUSE 3, and FUSE 4 are protection elements. The 24V_A power supply voltage, which is provided from the relay board 600 is applied to the FUSE 1. The 24V_B power supply voltage, which is provided from the relay board 600 is applied to the FUSE 3. The 24V_C power supply voltage, which is provided from the relay board 600 is applied to the FUSE 4. An FET or an overcurrent protection IC may be used as the protection element instead of the FUSE 1, FUSE 3, and FUSE 4.

After passing through the FUSE 1, the +24V_A power supply voltage becomes a +24V_A_HA voltage. After passing through the FUSE 3, the +24V_B power supply voltage becomes a +24V_B_FU3 voltage. After passing through the FUSE 4, the +24V_C power supply voltage becomes a +24V_C_FU4 voltage. The +24V_A_FU1 voltage is supplied to other component parts of the motor drive unit 233 or the like. The +24V_B_FU3 voltage is supplied to other component parts of the motor drive unit 235 or the like. The +24V_C_FU4 voltage is supplied to other component parts of the motor drive unit 237 or the like. Thus, a plurality of voltages output from a plurality of protection elements are used for driving a plurality of loads.

The +24V_A power supply voltage, +24V_B power supply voltage, and +24V_C power supply voltage are divided to be within the rated range of the ASIC 231, in order to decide whether or not these voltages are normally supplied from the power supply board 200 to the relay board 600. The +24V_A power supply voltage, +24V_B power supply voltage, and +24V_C power supply voltage are, by dividing the same, input to respective analog ports of the ASIC 231 as a +24V_A power supply detection signal, a +24V_B power supply detection signal, and a +24V_C power supply detection signal, respectively.

Similarly, in order to decide whether or not the +24V_A_FU1 voltage, the +24V_B_FU3 voltage, and the +24V_C_FU4 voltage are normally supplied to the subsequent stages of the FUSE 1, FUSE 3, and FUSE 4, they are divided to be within the rated range of the ASIC 231. The +24V_A_FU1 voltage, +24V_B_FU3 voltage, and +24V_C_FU4 voltage becomes, by dividing the same, a +24V_A_FU1 power supply detection signal, a +24V_B_FU3 power supply detection signal, and a +24V_C_FU4 power supply detection signal, respectively. The +24V_A_FU1 power supply detection signal, the +24V_B_FU3 power supply detection signal, and the +24V_C_FU4 power supply detection signal are input to the analog ports of the ASIC 231.

Similar to the first embodiment and the second embodiment, a predetermined number of motor driving units for driving a load is provided on the first driver board 2301. In the present embodiment, a drum motor 2331 which controls the rotation of the photosensitive drum 11 during image forming and a fixing motor 2351 which controls rotation of a fixing roller in the fixing device 19 and a developing motor 2371 which rotates the rotary developing unit 13 are connected to the first driver board 2301.

The motor drive unit 233 drives, under control of ASIC 231, to rotate the drum motor 2331. The +24V_A_FU1 voltage is supplied to the motor drive unit 233 as a power supply voltage for operating a load. The motor drive unit 235 drives, under control of ASIC 231, to rotate a fixing motor 2351. The +24V_B_FU3 voltage is supplied to the motor drive unit 235 as a power supply voltage for operating a load. The motor drive unit 237 drives, under control of ASIC 231, the fixing motor 2371. The +24V_C_FU4 voltage is supplied to the motor drive unit 237 as a power supply voltage for operating a load.

A predetermined number of detection units which obtain detection results of sensors for detecting rotation of a load driven by a motor drive unit is provided on the first driver board 2301. In the present embodiment, the drum rotation detector 2321, a fixing roller rotation detection sensor 2341, and a development unit rotation detection sensor 2361 are connected to the first driver board 2301. The drum rotation detector 2321 detects the rotation of the photosensitive drum 11. The fixing roller rotation detection sensor 2341 detects the rotation of a fixing roller. The development unit rotation detection sensor 2361 detects rotation of the rotary developing unit 13. The detection unit 232 transmits the detection result of the drum rotation detector 2321 to the ASIC 231. The detection unit 234 transmits the detection result of the fixing roller rotation detection sensor 2341 to the ASIC 231. The detection unit 236 transmits the detection result of the development unit rotation detection sensor 2361 to the ASIC 231.

The ASIC 231 controls, based on the CPU 222 of the engine control board 220, the timing of driving each load. The CPU 222 of the engine control board 220 monitors the state of signals obtained by the ASIC 231. The CPU 222 of the engine control board 220 communicates with the CPU 212 of the controller board 210 to control the operation of the control system in cooperation with the CPU 212. The CPU 222 of the engine control board 220 stores the abnormality detected by the first driver board 2301 and the abnormality detected by the second driver board 400 in the RAM 224, and notifies the CPU 212 of the controller board 210 of the same.

Failure Portion Identifying Process

Figure 9A:
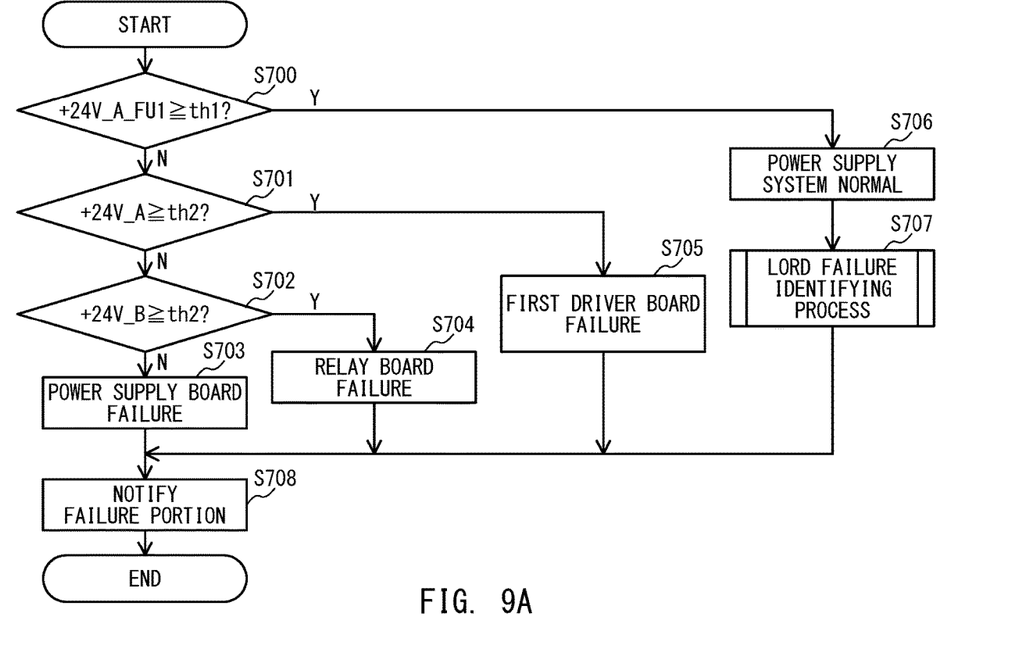
FIG. 9A and FIG. 9B are flow charts for representing a failure portion identifying process.
Figure 9B:
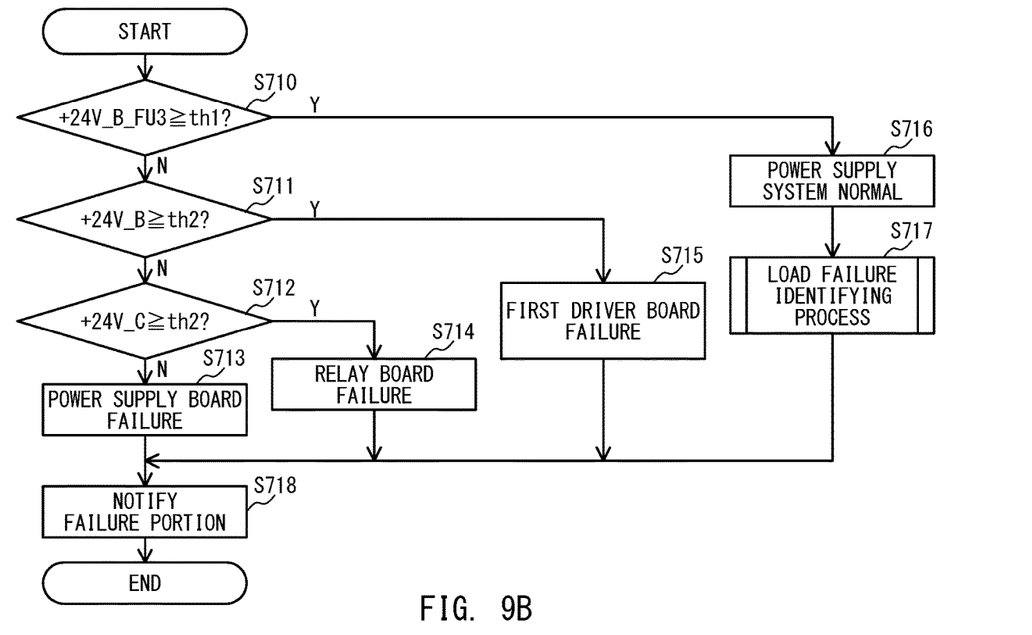

FIG. 9A and FIG. 9B are flowcharts showing the failure portion identifying process of the third embodiment. Note that the image forming process is the same process as in the first embodiment. FIG. 9A shows a process which is executed when the abnormality is detected in the load connected to the first driver board 2301 (load driven by the +24V_A_FU1 voltage). The CPU 222 of the engine control board 220 diagnoses the state of the power system of the +24V power supply voltage, and when it is determined that a cause of the abnormality has been occurred in the power system, the failure portion is identified. In this process, it is determined that an abnormality (error) has occurred because the drum rotation detector 2321 does not detect the rotation of the photosensitive drum 11 even after a predetermined time has elapsed after starting a control of rotating the drum motor 2331.

The CPU 222 of the engine control board 220 compares, using the ASIC 231 of the first driver board 2301, a voltage value of the +24V_A_FU1 voltage with a predetermined first threshold th1 (Step S700). Here, the first threshold th1 is set to 18V. When the voltage value of the +24V_A_FU1 voltage is greater than or equal to the first threshold th1 (Step S700: Y), the CPU 222 determines that the power supply system of the +24V power supply voltage is normal (Step S706). In this case, the CPU 222 determines that the abnormality is caused by the load to which the power supply system is connected to operate. Then, the CPU 222 performs a load failure identifying process for identifying the failed load is executed (Step S707). A detailed description of the load failure identifying process is omitted.

When the voltage value of the +24V_A_FU1 voltage is less than the first threshold th1 (Step S700: N), the CPU 222 determines that there is a cause of the abnormality in the power supply system of the +24V power supply voltage. The CPU 222 compares, using the ASIC 231, the voltage value of the +24V_A power supply voltage with a predetermined second threshold th2 (Step S701). Here, the second threshold th2 is set to 18 V, which is the same as the first threshold th1.

When the voltage value of the +24V_A power supply voltage is greater than or equal to the second threshold th2 (Step S701: Y), the CPU 222 determines that the +24V power supply voltage is normally supplied from the power supply board 200 and the relay board 600. Thereby, the CPU 222 determines that the cause of the abnormality in the power supply system of the +24V power supply voltage is the voltage output from the FUSE 1 provided on the first driver board 230. Therefore, the CPU 222 determines that the first driver board 230 is a failure portion that has caused an abnormality (Step S705).

When the voltage value of the +24V_A power supply voltage is less than the second threshold th2 (Step S701: N), the CPU 222 uses the ASIC 231 to compare the voltage value of the +24V_B power supply voltage, which is different from the +24V_A power supply voltage, with the second threshold th2. (Step S702). In this process, as a power supply voltage other than the +24V_A power supply voltage, +24V_C power supply voltage may be used.

When the voltage value of the +24V_B power supply voltage is greater than or equal to the second threshold th2 (Step S702: Y), the CPU 222 determines that the +24V power supply voltage is normally supplied from the power supply board 200. Thereby, the CPU 222 determines that the cause of the abnormality is the voltage output from the fuse 603 provided on the relay board 600 in the power supply system of the +24V power supply voltage. Therefore, the CPU 222 determines that the relay board 600 is the failure portion which has caused the abnormality (Step S704).

When the voltage value of the +24V_B power supply voltage is less than the second threshold th2 (Step S702: N), the CPU 222 determines that both the +24V_A power supply voltage and the +24V_B power supply voltage are not normally supplied from the power supply board 200. Thereby, the CPU 222 determines that the cause of the abnormality is the voltage output from the power supply board 200 in the power supply system of the +24V power supply voltage. Therefore, the CPU 222 determines that the power supply board 200 is the failure portion which has caused the abnormality (Step S703).

The CPU 222 notifies the CPU 212 of the controller board 210 of the failure portion determined by any of the steps of S703, S704, S705, and S707. In response to the notification, the CPU 212 notifies the failure portion (Step S708). This notification is performed in the same manner as the method shown in FIG. 4. By notifying the failure portion, the failure portion identifying process is finished. As to the first threshold th1 and the second threshold th2, these thresholds are already described in the first embodiment.

FIG. 9B shows a process which is executed when the abnormality is detected in the operation of the load connected to the first driver board 2301 (load driven by the +24V_B_FU3 voltage). The CPU 222 of the engine control board 220 diagnoses the state of the power system of the +24V power supply voltage, and when it is determined that a cause of the abnormality has been occurred in the power system, the failure portion is identified. In a case where the fixing roller rotation detector 2341 does not detect, after starting the control for rotating the fixing motor 2351, the rotation of the fixing roller even if a predetermined time has elapsed, it is determined that an abnormality (error) has occurred, and the above described process is performed.

The CPU 222 of the engine control board 220 compares, using the ASIC 231 of the first driver board 2301, a voltage value of the +24V_B_FU3 voltage with a predetermined first threshold th1 (Step S710). Here, the first threshold th1 is set to 18V. When the voltage value of the +24V_B_FU3 voltage is greater than or equal to the first threshold th1 (Step S710: Y), the CPU 222 determines that the power supply system of the +24V power supply voltage is normal (Step S716). In this case, the CPU 222 determines that the abnormality is caused by the load to which the power supply system is connected to operate. Then, the CPU 222 performs a load failure identifying process for identifying the failed load is executed (Step S717). A detailed description of the load failure identifying process is omitted.

When the voltage value of the +24V_B_FU3 voltage is less than the first threshold th1 (Step S710: N), the CPU 222 determines that there is a cause of the abnormality in the power supply system of the +24V power supply voltage. The CPU 222 compares, using the ASIC 231, the voltage value of the +24V_B power supply voltage with a predetermined second threshold th2 (Step S711). Here, the second threshold th2 is set to 18 V, which is the same as the first threshold th1.

When the voltage value of the +24V_B power supply voltage is greater than or equal to the second threshold th2

(Step S711: Y), the CPU 222 determines that the +24V power supply voltage is normally supplied from the power supply board 200 and the relay board 600. Thereby, the CPU 222 determines that the cause of the abnormality in the power supply system of the +24V power supply voltage is the voltage output from the FUSE 3 provided on the first driver board 230. Therefore, the CPU 222 determines that the first driver board 230 is a failure portion that has caused an abnormality (Step S715).

When the voltage value of the +24V_B power supply voltage is less than the second threshold th2 (Step S711: N), the CPU 222 uses the ASIC 231 to compare the voltage value of the +24V_C power supply voltage, which is different from the +24V_B power supply voltage, with the second threshold th2. (Step S712). In this process, as a power supply voltage other than the +24V_B power supply voltage, +24V_A power supply voltage may be used.

When the voltage value of the +24V_C power supply voltage is greater than or equal to the second threshold th2 (Step S712: Y), the CPU 222 determines that the +24V power supply voltage is normally supplied from the power supply board 200. Thereby, the CPU 222 determines that the cause of the abnormality is the voltage output from the fuse 604 provided on the relay board 600 in the power supply system of the +24V power supply voltage. Therefore, the CPU 222 determines that the relay board 600 is the failure portion which has caused the abnormality (Step S714).

When the voltage value of the +24V_C power supply voltage is less than the second threshold th2 (Step S712: N), the CPU 222 determines that both the +24V_B power supply voltage and the +24V_C power supply voltage are not normally supplied from the power supply board 200. Thereby, the CPU 222 determines that the cause of the abnormality is the voltage output from the power supply board 200 in the power supply system of the +24V power supply voltage. Therefore, the CPU 222 determines that the power supply board 200 is the failure portion which has caused the abnormality (Step S713).

The CPU 222 notifies the CPU 212 of the controller board 210 of the failure portion determined by any of the steps of S713, S714, S715, and S717. In response to the notification, the CPU 212 notifies the failure portion (Step S718). This notification is performed in the same manner as the method shown in FIG. 4. By notifying the failure portion, the failure portion identifying process is finished. As to the first threshold th1 and the second threshold th2, these thresholds are already described in the first embodiment.

As described above, when the abnormality occurs in the image forming apparatus 1, the image forming apparatus 1 determines whether or not a cause of the abnormality is the power supply system. When the cause of abnormality is the power supply system, the image forming apparatus 1 identifies a faulty component part which is the cause of the abnormality. For this reason, the service engineer can omit operations for identifying the abnormality point, and a work time for replacing parts can be reduced. Furthermore, even if the abnormality occurs in the relay board 600, the failure portion can be determined with a required minimum configuration by using the power supply detection signal of the first driver board 2301.

Fourth Embodiment

Figure 10:
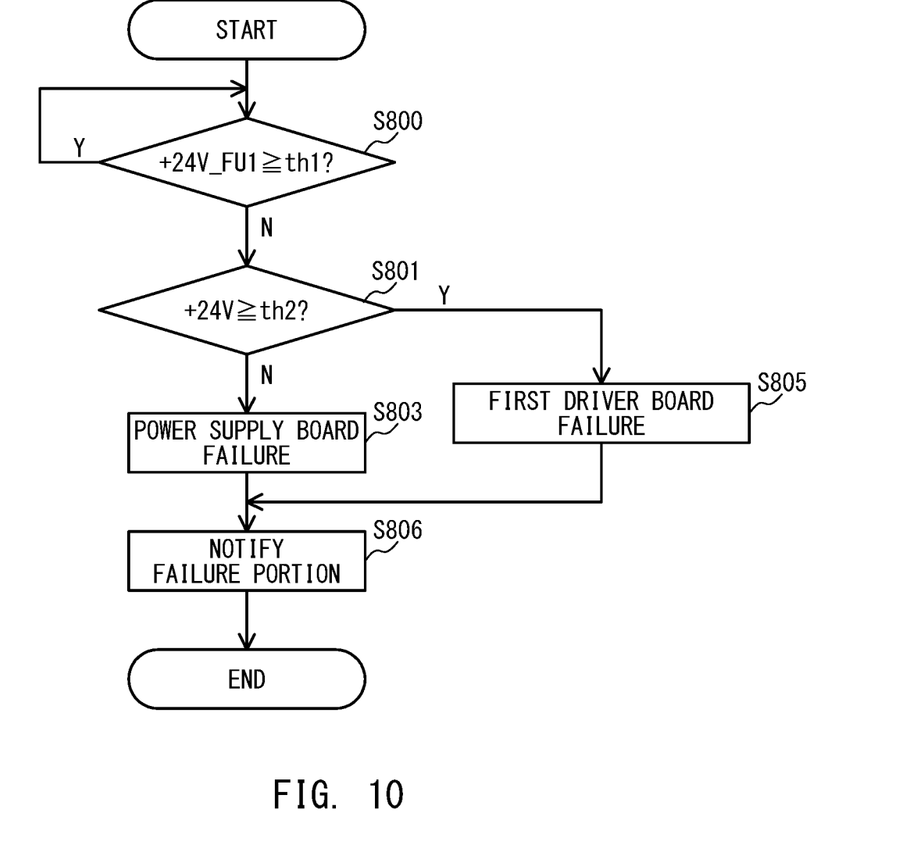
FIG. 10 is a flow chart for representing a failure portion identifying process.

FIG. 10 is a flowchart showing the failure portion identifying process of the fourth embodiment. This process shows the failure portion identifying process when the abnormality occurs in the +24V_FU1 voltage in FIG. 2 regardless of an abnormal detection result of an operation of a load. This process is performed with the configuration of the control system of FIG. 2. After completing supply of power supply voltages (the +12V power supply voltage and the +24V power supply voltage) to each board of the control system is completed, and the initial settings inside the CPU 222 of the engine control board 220 and the ASIC 231 of the first driver board 230 are completed, this process is started.

The CPU 222 of the engine control board 220 compares, using the ASIC 231 of the first driver board 230, a voltage value of the +24V_FU1 voltage with a predetermined first threshold th1 (Step S800). Here, the first threshold th1 is set to 18V. The CPU 222 monitors, at a regular interval, whether or not the voltage value of the +24V_FU1 voltage is less than the first threshold th1 (Step S800). When the voltage value of the +24V_FU1 voltage becomes less than the first threshold th1 (Step S800: N), the CPU 222 determines that there is a cause of the abnormality in the power supply system of the +24V power supply voltage. The CPU 222 compares, using the ASIC 231, the voltage value of the +24V power supply voltage with a predetermined second threshold th2 (Step S801). Here, the second threshold th2 is set to 18 V, which is the same as the first threshold th1.

When the voltage value of the +24V power supply voltage is greater than or equal to the second threshold th2 (Step S801: Y), the CPU 222 determines that the +24V power supply voltage is normally supplied from the power supply board 200. Thereby, the CPU 222 determines that the cause of the abnormality in the power supply system of the +24V power supply voltage is the voltage output from the FUSE 1 provided on the first driver board 230. Therefore, the CPU 222 determines that the first driver board 230 is a failure portion that has caused an abnormality (Step S805).

When the voltage value of the +24V power supply voltage is less than the second threshold th2 (Step S801: N), the CPU 222 determines that the +24V power supply voltage is not normally supplied from the power supply board 200. Thereby, the CPU 222 determines that the cause of the abnormality is the voltage output from the power supply board 200 in the power supply system of the +24V power supply voltage. Therefore, the CPU 222 determines that the power supply board 200 is the failure portion which has caused the abnormality (Step S803).

The CPU 222 notifies the CPU 212 of the controller board 210 of the failure portion determined by any of the steps of S803 and S805. In response to the notification, the CPU 212 notifies the failure portion (Step S806). This notification is performed in the same manner as the method shown in FIG. 4. By notifying the failure portion, the failure portion identifying process is finished. As to the first threshold th1 and the second threshold th2, these thresholds are already described in the first embodiment.

As described above, when an abnormality due to the power supply system occurs in the image forming apparatus 1, the image forming apparatus 1 can determine a component part which is a cause of the abnormality. By identifying a component part (board) in which an abnormality occurs, it is not necessary to perform an operation for identifying an abnormality point, and a work time (time required for repair work) for replacing parts can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-207949, filed Nov. 5, 2018 which is hereby incorporated by reference herein in its entirety.

What is claimed is:

1. An image forming apparatus comprising:
a power supply board configured to generate a power supply voltage;
a driver board, which includes a protection element to which the power supply voltage provided from the power supply board is applied, configured to drive a load used for forming an image using a voltage output from the protection element;
an engine control board configured to control an operation of the driver board, and
at least one processor configured to identify, in a case where an abnormality occurs in an operation of the load, a board that caused the abnormality based on a voltage value of the voltage output from the protection element and a voltage value of the power supply voltage;
wherein the at least one processor is configured to:
determine that the driver board is abnormal in a case where the voltage value of the voltage output from the protection element is less than a first predetermined value and the voltage value of the power supply voltage is greater than or equal to a second predetermined value; and
determine that the power supply board is abnormal in a case where the voltage value of the voltage output from the protection element is less than the first predetermined value and the voltage value of the power supply voltage is less than the second predetermined value.

2. The image forming apparatus according to claim 1, wherein the first predetermined value is greater than or equal to the second predetermined value.

3. The image forming apparatus according to claim 1, further comprising:
a second protection element which receives the power supply voltage supplied from the power supply board; and
a second driver board configured to drive a second load which is different from the load by a voltage output from the protection element, wherein the operation of the second driver board is controlled by the engine control board,
wherein the at least one processor is configured to identify, when an abnormality occurs in an operation of the second load, a board that is a cause of the abnormality according to a voltage value of the voltage output from the second protection element and the voltage value of the power supply voltage.

4. The image forming apparatus according to claim 1, wherein the at least one processor is configured to monitor the voltage value of the voltage output from the protection element and to detect an occurrence of the abnormality according to the voltage value of the voltage output from the protection element.

5. The image forming apparatus according to claim 1, wherein the power supply board is configured to generate a second power supply voltage which is different from the power supply voltage, and
wherein the at least one processor is driven by the second power supply voltage.

6. The image forming apparatus according to claim 1, further comprising a detection unit configured to detect an operation of the load,
wherein the at least one processor detects an occurrence of the abnormality according to a detection result of the detection unit.

7. The image forming apparatus according to claim 6, wherein the driver board includes a drive unit configured to drive the load and an obtaining unit configured to obtain the detection result of the detection unit, and the driver board is configured to notify the at least one processor of the detection result of the detection unit obtained by the obtaining unit.

8. The image forming apparatus according to claim 1, further comprising a notifying unit configured to cause the board that caused the abnormality identified by the at least one processor to be notified.

9. The image forming apparatus according to claim 8, wherein the notifying unit cause the board that caused the abnormality via a predetermined display to be notified.

10. The image forming apparatus according to claim 8, wherein the notifying unit notifies an external apparatus of the board that caused the abnormality via a communication line.

11. An image forming apparatus comprising:
a power supply board configured to generate a power supply voltage;
a driver board, which includes a protection element to which the power supply voltage provided from the power supply board is applied, configured to drive a load used for forming an image using a voltage output from the protection element;
an engine control board configured to control an operation of the driver board,
a relay board configured to divide the power supply voltage into a plurality of divided voltages, and
at least one processor configured to identify, in a case where an abnormality occurs in an operation of the load, a board that caused the abnormality based on a voltage value of the voltage output from the protection element and a voltage value of the power supply voltage;
wherein a plurality of the protection elements are provided in the driver board, and the divided voltages are supplied to a plurality of the protection elements to thereby drive each of a plurality of loads by a voltage output from one of the plurality of protection elements,
wherein the at least one processor is configured to identify, when an abnormality occurs in an operation of any one of the plurality of loads, the board that caused the abnormality according to a voltage value of the voltage supplied to the load, the power supply voltage supplied to the protection element that generates a voltage supplied to the load, and the power supply voltage supplied to the protection element that generates a voltage supplied to another load.

12. The image forming apparatus according to claim 11, wherein the power supply board is configured to generate a second power supply voltage which is different from the power supply voltage, and
wherein the at least one processor is driven by the second power supply voltage.

13. The image forming apparatus according to claim 11, further comprising a detection unit configured to detect an operation of the load,
wherein the at least one processor detects an occurrence of the abnormality according to a detection result of the detection unit.

14. The image forming apparatus according to claim 13, wherein the driver board includes a drive unit configured to drive the load and an obtaining unit configured to obtain the detection result of the detection unit, and the driver board is configured to notify the at least one processor of the detection result of the detection unit obtained by the obtaining unit.

15. The image forming apparatus according to claim 11, further comprising a notifying unit configured to cause the board that caused the abnormality identified by the at least one processor to be notified.

16. The image forming apparatus according to claim 15, wherein the notifying unit cause the board that caused the abnormality via a predetermined display to be notified.

17. The image forming apparatus according to claim 15, wherein the notifying unit notifies an external apparatus of the board that caused the abnormality via a communication line.

\* \* \* \* \*